UNITED STATES PATENT OFFICE.

CHESTER E. ANDREWS, OF PITTSBURGH, PENNSYLVANIA, ASSIGNOR TO THE WALKER CHEMICAL COMPANY, OF PITTSBURGH, PENNSYLVANIA, A CORPORATION OF DELAWARE.

VULCANIZING PROCESS.

1,280,940.      Specification of Letters Patent.      Patented Oct. 8, 1918.

No Drawing.      Application filed February 27, 1918. Serial No. 219,446.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Vulcanizing Processes, of which the following is a specification.

The present invention relates to vulcanization, and has been found to be of special value in the case of the vulcanization of rubber. While I describe this invention as applicable to rubber, it is to be understood that I do not confine the invention thereto, since it is also applicable in the vulcanization of other gums of a somewhat similar nature.

It has heretofore been proposed to add to the mixture of sulfur and rubber, prior to the vulcanizing operation, a small amount of anilin, to act as a "catalyst", during the operation, whereby the time necessary for the vulcanizing operation is greatly reduced, and it is claimed that a superior product is produced.

In the prior art, several other materials have been proposed as substitutes for the anilin, originally proposed by Price, but such materials in general have not been found to be materially better than the anilin, and in many cases it has been found that such substitutes are not nearly as good as anilin. So far as I am aware, such anilin substitutes have not come into extended use in the art, presumably on account, either of the greater expense attending their use, or else on account of the fact that the products are not as good as when anilin is employed.

I have now found that amino cymene, a substance having the formula:

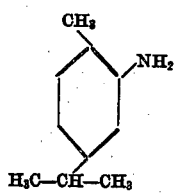

is in some respects better than anilin for the purpose.

This material can be cheaply prepared, and its price could be made considerably lower than that of anilin. This material also is found to have some specific advantages over anilin, especially in that the vulcanized rubber (*a*) is capable of greater "stretch", (*b*) is more resistant to atmospheric oxidation (hence "longer-lived") and (*c*) has a better color, than that produced by the use of anilin as a vulcanization catalyst. The amino cymene also is found to be somewhat quicker in its action, *i. e.* it is not necessary to heat the mixture as long, in the vulcanization operation (the same temperature and pressure being used) as when anilin alone is used. Less of the amino cymene, than of anilin, will produce satisfactory results.

Without limiting myself to details, I give the following example to more fully explain the invention, and how the same is to be performed (the parts being by weight):—

To a mixture of 100 parts of raw unvulcanized rubber and sulfur, there are added about 5 parts of amino cymene, and the mixture well kneaded. The material, or any desired part thereof (which may be molded into the desired form if desired) is placed in a vulcanizer and heated under pressure to about 130 to 150° C., for 1 to 2 hours. If the vulcanizer is first filled with steam, or a little water placed in the bottom thereof before the heating, a better result is secured.

The proportions of sulfur and rubber in the initial material may be varied between wide limits, as is well known in the art. The proportion of amino cymene can be varied between wide limits, say from .5% to 5% giving good results, the larger amounts giving quicker vulcanization.

In place of amino cymene, I may use salts thereof, *e. g.* the hydrochlorid, but this is not appreciably better than the simpler and less expensive body.

What is claimed is:

1. Process of vulcanizing rubber-like material which comprises heating, under vulcanizing conditions, a mixture comprising such rubber-like material, a sulfur material and amino methyl isopropyl benzene.

2. The process which comprises vulcanizing rubber in the presence of amino cymene.

3. Vulcanized rubber containing amino cymene or its derivatives.

4. In the process of vulcanizing, the addition of amino cymene as an accelerator of the vulcanizing action.

5. A vulcanized rubber compound containing sulfur and amino cymene as transformed by the heat of vulcanization.

In testimony whereof I affix my signature.

CHESTER E. ANDREWS.